United States Patent
Kim et al.

(10) Patent No.: US 7,534,838 B2
(45) Date of Patent: May 19, 2009

(54) GOLF BALL INCORPORATING AN AMINE-MODIFIED IONOMER RESIN AND METHOD OF MAKING IT

(75) Inventors: Hyun J. Kim, Carlsbad, CA (US); Hong G. Jeon, Carlsbad, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 0 days.

(21) Appl. No.: 10/845,370

(22) Filed: May 12, 2004

(65) Prior Publication Data

US 2004/0236030 A1   Nov. 25, 2004

Related U.S. Application Data

(60) Provisional application No. 60/470,174, filed on May 13, 2003.

(51) Int. Cl.
*A63B 37/12* (2006.01)

(52) U.S. Cl. .................. 525/329.9; 473/373; 528/64

(58) Field of Classification Search .............. 525/329.9; 528/64; 473/373
See application file for complete search history.

(56) References Cited

U.S. PATENT DOCUMENTS

| | | | | |
|---|---|---|---|---|
| 6,037,419 | A * | 3/2000 | Takesue et al. | 525/329.9 |
| 6,100,321 | A | 8/2000 | Chen | 524/400 |
| 6,852,784 | B2 * | 2/2005 | Sullivan | 524/322 |
| 6,894,098 | B2 * | 5/2005 | Rajagopalan et al. | 524/322 |
| 2003/0050373 | A1 * | 3/2003 | Chen | 524/322 |
| 2003/0158312 | A1 | 8/2003 | Chen | 524/394 |
| 2004/0059062 | A1 * | 3/2004 | Kim | 525/222 |

* cited by examiner

*Primary Examiner*—Peter D. Mulcahy
*Assistant Examiner*—Henry Hu
(74) *Attorney, Agent, or Firm*—Klarquist Sparkman LLP

(57) ABSTRACT

An ionomer modified by an amine-functionalized chemical for use in sporting equipment. The ionomer modified by an amine-functionalized chemical facilitates high COR, compression, durability, and ease of processing.

25 Claims, No Drawings

GOLF BALL INCORPORATING AN AMINE-MODIFIED IONOMER RESIN AND METHOD OF MAKING IT

CROSS-REFERENCE TO RELATED APPLICATION

Priority is claimed under 35 U.S.C. § 119(e) to U.S. Provisional Patent Application No. 60/470,174, filed on May 13, 2003, entitled "Amine-Modified Ionomer Resin" by Hyun Kim and Hong Guk Jeon, which application is incorporated by reference herein.

BACKGROUND OF THE INVENTION

1. Field of the Invention

The present invention relates to ionomer resins that provide for superior properties for a variety of articles of manufacture, including golf balls. The present invention also relates to methods of manufacture of these resins.

2. Description of Related Art

Ionomers, at their most general definition, are ion-containing polymers. Ionomeric resins generally available are ionomeric copolymers of an olefin and a metal salt of a unsaturated carboxylic acid, or ionomeric terpolymers having a co-monomer within their structures. These resins vary in resiliency, flexural modulus, and hardness. Examples of these resins include those marketed under the trademark SURLYN manufactured by E.I. DuPont de Nemours & Company of Wilmington, Del., and IOTEK manufactured by ExxonMobil Corporation of Irving, Tex. These materials are chosen for use in a variety of applications, because they provide good properties with respect to cost, weight, and durability. These marketed ionomers are described in greater detail below.

These copolymeric and terpolymeric ionomers may be described as copolymer E/Y or terpolymer E/X/Y, where E represents ethylene, X represents a softening co-monomer such as acrylate or methacrylate, and Y represents acrylic or methacrylic acid. In particular, the acid moiety of Y is neutralized to form an ionomer by a cation such as lithium, sodium, potassium, magnesium, calcium, barium, lead, tin, zinc or aluminum. Also, a combination of such cations is used for the neutralization. Copolymeric ionomers are obtained by neutralizing at least a portion of the carboxylic groups in a copolymer of an α-olefin and an α,β-unsaturated carboxylic acid having 3 to 8 carbon atoms, with a metal ion. Examples of suitable α-olefins include ethylene, propylene, 1-butene, and 1-hexene. Examples of suitable unsaturated carboxylic acids include acrylic, methacrylic, ethacrylic, α-chloroacrylic, crotonic, maleic, fumaric, and itaconic acid. Copolymeric ionomers include ionomers having varied acid contents and degrees of acid neutralization, neutralized by monovalent, or multivalent cations discussed above.

Terpolymeric ionomers are obtained by neutralizing at least a portion of the carboxylic groups in a terpolymer of an α-olefin, and an α,β-unsaturated carboxylic acid having 3 to 8 carbon atoms and an α,β-unsaturated carboxylate having 2 to 22 carbon atoms with metal ion. Examples of suitable α-olefins include ethylene, propylene, 1-butene, and 1-hexene. Examples of suitable unsaturated carboxylic acids include acrylic, methacrylic, ethacrylic, α-chloroacrylic, crotonic, maleic, fumaric, and itaconic acid. Terpolymeric ionomers include ionomers having varied acid contents and degrees of acid neutralization, neutralized by monovalent or multi cations discussed above.

As stated above, ionomers are used in a variety of applications. In particular, ionomers are used in the manufacture of sports equipment, such as golf balls. Golf balls generally include a core and at least one cover layer surrounding the core. Balls can be classified as two-piece, multi-layer, or wound balls. Two-piece balls include a spherical inner core and an outer cover layer. Multi-layer balls include a core, a cover layer and one or more intermediate (or mantle) layers. The cover and intermediate layers themselves may include multiple layers. Wound balls include a core, a rubber thread wound under tension around the core to a desired diameter, and a cover layer, typically of balata material. Material characteristics of the compositions used in sports equipment, including golf ball layers are important in determining the durability and performance of the equipment. For example, with respect to golf balls, the composition of a golf ball cover layer is important in determining the ball's durability, scuff resistance, speed, shear resistance, spin rate, feel, and "click" (the sound made when a golf club head strikes the ball). Various materials having different physical properties are used to make cover layers to create a ball having the most desirable performance possible.

Ionomers are particularly useful in compositions for making golf ball covers, because they can provide a good mix of durability, hardness, and feel. Often, ionomers are blended in cover compositions. An ionomer having a high flexural modulus often is combined in a cover composition with another ionomer having a low flexural modulus. The resulting intermediate-modulus blend will provide for acceptable hardness, spin, and durability of the resulting cover. These ionomer blends also can be readily used with various fillers, fibers, colorants, and processing aids commonly used in polymer blends. However, even with blending of ionomers to improve properties, their use is not completely satisfactory. Improving one characteristic can lead to worsening another. For example, blending an ionomer having a high flexural modulus with an ionomer having a low flexural modulus can lead to reduced resilience and durability compared to use of the high-modulus ionomer alone. In general, it is difficult to make a material for an ionomeric golf ball cover layer to provide low hardness, good feel, high speed, high resilience, and good shear durability.

To improve upon the properties of conventional ionomers, Spalding Sports Worldwide, Inc. ("Spalding") and E.I. dupont de Nemours and Co. ("DuPont") each have patented conventional ionomers modified by metal fatty acids. In an exemplary ionomer of this type, the addition of sodium stearate increases the COR of the resulting ionomer when used in for example, golf balls, without increasing the hardness of the ionomer. DuPont also has patented conventional ionomers incorporating a bimodal molecular weight distribution, which can be used to adjust the properties of the ionomers. Examples of references disclosing modified ionomers include U.S. Pat. No. 6,100,321 and U.S. Published Patent Application No. 2003/0158312, both to Chen. DuPont and other companies also have recently been increasing the acid neutralization in these ionomers to be almost 100%, also to adjust the properties of the ionomers.

Despite the variety of modified and high-neutralization ionomers currently available, no ionomer exists that provides for ideal properties of COR, compression, durability, and ease of processing. In view of the above, it is apparent that a need exists for improved polymers for use in a variety of applications, such as sports equipment. The present invention fulfills this need and provides further related advantages.

SUMMARY OF THE INVENTION

An improved polymer is provided for use in a variety of application, including sports equipment, which facilitates high COR, compression, and durability, and ease of processing. Embodiments of the present invention include an ionomer modified by an amine-functionalized chemical.

In other, more detailed features of the invention, the ionomer is selected from the group consisting of a copolymeric ionomer and a terpolymeric ionomer. The amine-functionalized chemical is selected from the group consisting of polyamines, diamines, monoamines, and mixtures thereof.

In other, more detailed features of the invention, the amine-functionalized chemical is selected from the group consisting of bis[1,3-aminomethyl]cyclohexane, 1,3diaminomethyl xylene (1,3 xylylenediamine), isophorone diamine, norbomanediamine, bis[1,2-aminomethyl]cyclohexane, bis[1,4-aminomethyl]cyclohexane, m-xylenediamine, o-xylenediamine, p-xylenediamine, 4,4'-methylene bis[benzenamine], phenylene diamine, diethylene triamine, hexamethylene diamine, N,N,bis[3-amino propyl]peperidine, 1,4 butane diamine, 1,5 pentane diamine, triethylene tetramine, neoalkoxy titanate coupling agents, and neoalkoxy zirconate coupling agents. The neoalkoxy titanate coupling agents are selected from the group consisting of neopentyl (diallyl) oxy tri(Nethylenediamino) ethyl titanate, neopentyl (diallyl) oxy tri(m-amino) phenyl titanate, and isopropyl tri(N-ethylenediamino)ethyl titanate. The neoalkoxy zirconate coupling agents are selected from the group consisting of neopentyl (diallyl) oxy tri(N-ethylenediamino) ethyl zirconate, neopentyl (diallyl) oxy tri(m-amino) phenyl zirconate, and dineopentyl (diallyl) oxy di(3-mercapto) propionic zirconate.

Another exemplary embodiment of the invention is a composition including an ionomer modified by an amine-functionalized chemical, and a polymer. In other, more detailed features of the invention, the polymer is selected from the group consisting of thermoplastic elastomer, thermoset elastomer, synthetic rubber, thermoplastic vulcanizate, copolymeric ionomer, terpolymeric ionomer, polycarbonate, polyolefin, polyamide, copolymeric polyamide, polyesters, polyvinyl alcohols, acrylonitrile-butadiene-styrene copolymers, polyarylate, polyacrylate, polyphenylene ether, modified-polyphenyl ether, high-impact polystyrene, diallyl phthalate polymer, metallocene catalyzed polymers, acrylonitrile-styrene-butadiene, styrene-acrylonitrile, olefin-modified styrene-acrylonitrile, acrylonitrile styrene acrylonitrile, styrene-maleic anhydryde polymer, styrenic copolymer, functionalized styrenic copolymer, functionalized styrenic terpolymer, styrenic terpolymer, cellulose polymer, liquid crystal polymer, ethylene-propylene-diene terpolymer, ethylene-vinyl acetate copolymers, ethylene-propylene copolymer, ethylene vinyl acetate, polyurea, polysiloxane, and metallocene-catalyzed polymers thereof.

In other, more detailed features of the invention, the composition further includes a polyamide. The polyamide is obtained using a process selected from the group consisting of a polycondensation of a dicarboxylic acid with a diamine, a ring-opening polymerization of a cyclic lactam, a polycondensation of an aminocarboxylic acid, and a copolymerization of a cyclic lactam with a dicarboxylic acid and a diamine. The polyamide is selected from the group consisting of Nylon 6, Nylon 66, Nylon 610, Nylon 11, Nylon 12, copolymerized Nylon, Nylon MXD6, and Nylon 46.

In other, more detailed features of the invention, the composition further includes a polyester elastomer. The polyester elastomer is selected from the group consisting of SKYPEL and SEPTON.

In other, more detailed features of the invention, the composition further includes a silicone material. The silicone material is selected from the group consisting of a monomer, an oligomer, a prepolymer, a polymer, trimethylsiloxy-endblocked dimethylsiloxane-methylhexenylsiloxane copolymers, dimethylhexenlylsiloxy-endblocked dimethylsiloxane-methylhexenylsiloxane copolymers, trimethylsiloxy-endblocked dimethylsiloxane-methylvinylsiloxane copolymers, trimethylsiloxy-endblocked methylphenylsiloxane-dimethylsiloxane-methylvinylsiloxane copolymers, dimethylvinylsiloxy-endblocked dimethylpolysiloxanes, dimethylvinylsiloxy-endblocked dimethylsiloxane-methylvinylsiloxane copolymers, dimethylvinylsiloxy-endblocked methylphenylpolysiloxanes, dimethylvinylsiloxy-endblocked methylphenylsiloxane-dimethylsiloxane-methylvinylsiloxane copolymers, SILASTIC, BLENSIL, and ELASOSIL. The silicone material includes an alkenyl group having at least two carbon atoms. The alkenyl group is selected from the group consisting of vinyl, allyl, butenyl, pentenyl, hexenyl, and decenyl.

In other, more detailed features of the invention, the composition further includes a copolymer. The copolymer is an epoxy monomer. The epoxy monomer is selected from the group consisting of a styrene-butadiene-styrene block copolymer, a styrene-isoprene-styrene block copolymer, ESBS A1005, ESBS A1010, ESBS A1020, ESBS AT018, and ESBS AT019.

In other, more detailed features of the invention, the composition further includes an ingredient selected from the group consisting of a colorant, a UV stabilizer, a photo stabilizer, an antioxidant, a colorant, a dispersant, a mold releasing agent, a processing aid, a filler, and mixtures thereof. The filler is an inorganic filler. The inorganic filler is selected from the group consisting of titanium dioxide, calcium carbonate, zinc sulfate, and zinc oxide. The filler is selected from the group consisting of zinc oxide, barium sulfate, tungsten.

Another exemplary embodiment of the invention is a golf ball including a core and a cover layer over the core, wherein the core or cover layer includes an ionomer modified by an amine-functionalized chemical. In other, more detailed features of the invention, the golf ball further comprises an intermediate layer situated between the core and the cover layer. The intermediate layer includes the ionomer modified by an amine-functionalized chemical.

An exemplary method according to the invention is a method for making an ionomer modified by an amine-functionalized chemical. The method includes providing an ionomer, providing an amine-functionalized chemical, and mixing the ionomer with the amine-functionalized chemical.

An exemplary method according to the invention is a method for making a golf ball. The method includes providing an ionomer, providing an amine-functionalized chemical, mixing the ionomer with the amine-functionalized chemical, and incorporating the mixture of the ionomer and the amine-functionalized chemical into a golf ball.

Other features of the invention should become apparent from the following description of the preferred embodiments.

DETAILED DESCRIPTION OF THE PREFERRED EMBODIMENTS

The present invention is embodied in ionomers modified using an amine-functionalized chemical. As a result of this modification, these ionomers provide desirable properties when compared to conventional, non-modified ionomers, while retaining comparable ease of manufacture and processing. In particular, these modified ionomers exhibit higher COR (and therefore resilience) at a similar or lower compression, when compared to conventional ionomers. The present invention also is embodied in golf ball covers, intermediate layers and cores incorporating these modified ionomers, and it additionally resides in methods of manufacture of these ionomers and golf balls, incorporating these ionomers.

These ionomers are manufactured from conventional metal-neutralized ionomers or their non-ionomeric precursors. The conventional ionomers preferably have total neutralization levels of greater than 1%, more preferably 10-80%, more preferably 25-60%, and most preferably 40-50%. The conventional ionomers are modified by an amine-functionalized chemical using conventional methods. The conventional ionomers can be mixed with polyamines, diamines, monoamines, or mixtures of these, with diamines most preferred. The conventional ionomers can be partially or fully neutralized, or alternatively they can be non-neutralized when mixed with the amine(s), and then partially or fully neutralized using any mono- or multivalent metal cation. The metal cation can be added to the conventional ionomer alone, or to the ionomer after mixing with amine-functionalized chemical(s), using any conventional mixing methods, such as melt-mixing.

Preferred chemicals incorporating amines for use in the present invention include: bis[1,3-aminomethyl]cyclohexane (BAC); 1,3-diaminomethyl xylene (1,3 xylylenediamine); isophorone diamine, norbornanediamine; bis[1,2-aminomethyl]cyclohexane; bis[1,4-aminomethyl]cyclohexane; m-xylenediamine; o-xylenediamine; p-xylenediamine; 4,4'-methylene bis[benzenamine]; phenylene diamine; diethylene triamine; hexamethylene diamine; N,N,bis[3-amino propyl] peperidine; 1,4 butane diamine; 1,5 pentane diamine; triethylene tetramine; neoalkoxy titanate coupling agents, such as neopentyl (diallyl) oxy tri(Nethylenediamino) ethyl titanate, neopentyl (diallyl) oxy tri(m-amino) phenyl titanate, and isopropyl tri(N-ethylenediamino)ethyl titanate; and neoalkoxy zirconate coupling agents, such as neopentyl (diallyl) oxy tri(N-ethylenediamino) ethyl zirconate, neopentyl (diallyl) oxy tri(m-amino) phenyl zirconate, and dineopentyl (diallyl) oxy di(3-mercapto) propionic zirconate. Most preferred among these is bis[1,3-aminomethyl]cyclohexane. The amount of the amine-functionalized chemical can be varied, depending on the acid level and degree of neutralization of the conventional ionomer used.

These amine-modified ionomers can be used in a variety of applications with ease. They also can be freely adjusted to maximize properties for a given application. In particular, these ionomers are suitable for use in golf balls, particularly in golf ball cover and intermediate layers. These covers are suited for use with all types of ball constructions, including those having wound layers, multiple core, intermediate, or cover layers, or liquid layers. The balls can readily be prepared using known methods, including injection molding, compression molding, or casting.

In addition to the amine-modified ionomers of the present invention, compositions for making golf balls within the scope of the present invention may incorporate additional polymers. Examples of suitable additional polymers for use in the present invention include, but are not limited to, the following: thermoplastic elastomer, thermoset elastomer, synthetic rubber, thermoplastic vulcanizate, copolymeric ionomer, terpolymeric ionomer, polycarbonate, polyolefin, polyamide, copolymeric polyamide, polyesters, polyvinyl alcohols, acrylonitrile-butadiene-styrene copolymers, polyarylate, polyacrylate, polyphenylene ether, modified-polyphenyl ether, high-impact polystyrene, diallyl phthalate polymer, metallocene catalyzed polymers, acrylonitrile-styrene-butadiene (ABS), styrene-acrylonitrile (SAN) (including olefin-modified SAN and acrylonitrile styrene acrylonitrile), styrene-maleic anhydryde (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, and polysiloxane or any metallocene-catalyzed polymers of these species.

Suitable polyamides for use as an additional material in compositions within the scope of the present invention also include resins obtained by: (1) polycondensation of (a) a dicarboxylic acid, such as oxalic acid, adipic acid, sebacic acid, terephthalic acid, isophthalic acid or 1,4-cyclohexanedicarboxylic acid, with (b) a diamine, such as ethylenediamine, tetramethylenediamine, pentamethylenediamine, hexamethylenediamine or decamethylenediamine, 1,4-cyclohexyldiamine or m-xylylenediamine; (2) a ring-opening polymerization of cyclic lactam, such as $\epsilon$-caprolactam or $\omega$-laurolactam; (3) polycondensation of an aminocarboxylic acid, such as 6-aminocaproic acid, 9-aminononaoic acid, 11-aminoundecanoic acid or 12-aminododecanoic acid; or, (4) copolymerization of a cyclic lactam with a dicarboxylic acid and a diamine. Specific examples of suitable polyamides include Nylon 6, Nylon 66, Nylon 610, Nylon 11, Nylon 12, copolymerized Nylon, Nylon MXD6, and Nylon 46.

Other preferred materials suitable for use as an additional material in compositions within the scope of the present invention include polyester elastomers marketed under the tradename SKYPEL by SK Chemicals of South Korea, or triblock copolymers marketed under the tradename SEPTON by Kuraray Corporation of Kurashiki, Japan. All of the materials listed above may provide for particular enhancements to ball layers prepared within the scope of the present invention.

Silicone materials also are well suited for blending into compositions within the scope of the present invention. These may be monomers, oligomers, prepolymers, or polymers, with or without additional reinforcing filler. One type of silicone material that is suitable may incorporate at least 1 alkenyl group having at least 2 carbon atoms in their molecules. Examples of these alkenyl groups include, but are not limited to, vinyl, allyl, butenyl, pentenyl, hexenyl and decenyl. The alkenyl functionality may be located at any location of the silicone structure, including one or both terminals of the structure. The remaining (i.e., non-alkenyl) silicon-bonded organic groups in this component are independently selected from hydrocarbon or halogenated hydrocarbon groups that contain no aliphatic unsaturation. Non-limiting examples of these include: alkyl groups, such as methyl, ethyl, propyl, butyl, pentyl and hexyl; cycloalkyl groups, such as cyclohexyl and cycloheptyl; aryl groups, such as phenyl, tolyl and xylyl; aralkyl groups, such as benzyl and phenethyl; and halogenated alkyl groups, such as 3,3,3-trifluoropropyl and chloromethyl. Another type of silicone material suitable for use in the present invention is one having hydrocarbon groups that lack aliphatic unsaturation. Specific examples of suitable silicones for use in making compositions of the present invention include the following: trimethylsiloxy-endblocked dimethylsiloxane-methylhexenylsiloxane copolymers; dimethylhexenlylsiloxy-endblocked dimethylsiloxane-methylhexenylsiloxane copolymers; trimethylsiloxy-endblocked dimethylsiloxane-methylvinylsiloxane copolymers; trimethylsiloxy-endblocked methylphenylsiloxane-dimethylsiloxane-methylvinylsiloxane copolymers; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked methylphenylsiloxane-dimethylsiloxane-methylvinylsiloxane copolymers; and, the copolymers listed above, in which at least one end group is dimethylhydroxysiloxy. Commercially available silicones suitable for use in compositions within the scope of the present invention include Silastic by Dow Coming Corp. of Midland, Mich., Blensil by GE Silicones of Waterford, N.Y., and Elastosil by Wacker Silicones of Adrian, Mich.

In addition to copolymeric amine-modified ionomers within the scope of the present invention, other types of copolymers also may be added to golf ball compositions within the scope of the present invention. Examples of copolymers comprising epoxy monomers and which are suitable for use within the scope of the present invention include styrene-butadiene-styrene block copolymers, in which the polybutadiene block contains epoxy group, and styrene-isoprene-styrene block copolymers, in which the polyisoprene block contains epoxy. Commercially available examples of these epoxy functional copolymers include ESBS A1005, ESBS A1010, ESBS A1020, ESBS AT018, and ESBS AT019, marketed by Daicel Chemical Industries, Ltd.

Compositions for making golf balls within the scope of the present invention also may include, in suitable amounts, one or more additional ingredients generally employed in polymer compositions. Agents provided to achieve specific functions, such as additives and stabilizers, may be present. Suitable ingredients include colorants, UV stabilizers, photo stabilizers, antioxidants, colorants, dispersants, mold releasing agents, processing aids and fillers. The compositions may incorporate, for example, inorganic fillers, such as titanium dioxide, calcium carbonate, zinc sulfide or zinc oxide. Additional fillers may be chosen to impart additional density to the compositions, such as zinc oxide, barium sulfate, tungsten or any other metallic powder having density higher than that of the base polymeric resin. Any organic or inorganic fibers, either continuous or non-continuous, also may be in the composition. An example of these is silica-containing filler, which preferably is selected from finely divided, heat-stable minerals, such as fumed and precipitated forms of silica, silica aerogels and titanium dioxide having a specific surface area of at least about 10 $m^2$/gram.

EXAMPLES

Compositions within the scope of the present invention were prepared and tested for a variety of mechanical properties. The compositions included Surlyn 9910, and ionomer manufactured by DuPont, and BAC in varying amounts as the amine compound. The ionomer and BAC were mixed to form the modified ionomer compositions of the present invention. The compositions were tested for tensile strength, elastic modulus, ultimate elongation, flexural modulus, tensile energy absorption, and hardness. For comparison, the unmodified ionomer also was similarly tested. Results of this testing are shown in Table 1 below. Also, the compositions, as well as a comparison sample of unmodified ionomer, were formed into spheres and tested for COR and PGA compression. Results of this testing are shown in Table 2 below.

TABLE 1

| BAC % | Tensile Strength (psi) | Elastic Modulus (ksi) | Ultimate Elongation (%) | Flexural modulus (psi) | Tensile energy Absorption (lbf/in) | Hardness (Shore D) |
|---|---|---|---|---|---|---|
| 0 | 4440 | 26 | 80 | 53400 | 370 | 62 |
| 1 | 5340 | 30 | 110 | 59500 | 590 | 61 |
| 3 | 4870 | 33 | 120 | 64300 | 620 | 63 |
| 5 | 4180 | 32 | 140 | 66900 | 650 | 63 |

TABLE 2

| BAC % | PGA Compression | % Increase in PGA Compression | COR | % Increase in COR |
|---|---|---|---|---|
| 0 | 154 | N/A | 0.684 | N/A |
| 1 | 158 | 2.6 | 0.704 | 3 |
| 3 | 157 | 1.9 | 0.733 | 7.2 |
| 5 | 157 | 1.9 | 0.746 | 9.1 |

The data in Table 1 indicate that the compositions of the present invention exhibited greater tensile strength, elastic modulus, and flexural modulus than the unmodified ionomer. Increasing amine content led to less of an increase in tensile strength, but more of an increase in flexural modulus, with no clear trend for elastic modulus. Also, toughness of the compositions of the present invention, as indicated by tensile energy absorption and ultimate elongation, were dramatically greater than the unmodified ionomer, increasing with increased amine content. Meanwhile, despite the changes in other properties, hardnesses of the compositions of the present invention were not substantially greater than that of the unmodified ionomer. The date in Table 2 further indicate that though the PGA compressions of the spheres made from the compositions within the scope of the present invention are essentially identical to that of the unmodified ionomer, being greater by less than two to three percent, the COR of these spheres is significantly greater. COR increased by about 9% for the composition incorporating 5% BAC, compared to the unmodified ionomer.

Although the invention has been disclosed in detail with reference only to the preferred embodiments, those skilled in the art will appreciate that additional amine-modified ionomers and golf balls incorporating them can be made without departing from the scope of the invention.

The foregoing detailed description of the present invention is provided for purposes of illustration, and it is not intended to be exhaustive or to limit the invention to the particular embodiments disclosed. The embodiments can provide different capabilities and benefits, depending on the configuration used to implement the key features of the invention. Accordingly, the scope of the invention is defined only by the following claims.

What is claimed is:

1. A golf ball comprising a core and an outer cover layer over the core, wherein the outer cover layer includes an ionomer modified by an amine-functionalized chemical, the ionomer comprising a copolymeric ionomer E/Y or a terpolymeric ionomer E/X/Y, where E represents ethylene, X represents a softening monomer, and Y represents acrylic or methacrylic acid, and wherein the golf ball has a coefficient of restitution of less than 0.830.

2. The golf ball of claim 1, further comprising an intermediate layer, situated between the core and the outer cover layer, wherein the golf ball has a coefficient of restitution of from 0.704 to 0.746.

3. The golf ball according to claim 1, wherein the amine-functionalized chemical is selected from the group consisting of polyamines, diamines, monoamines, and mixtures thereof.

4. The golf ball according to claim 1, wherein the amine-functionalized chemical is selected from the group consisting of bis[1,3-aminomethyl]cyclohexane, 1,3-diaminomethyl xylene (1,3-xylylenediamine), isophorone diamine, norbornanediamine, bis[1,2-aminomethyl]cyclohexane, bis[1,4-aminomethyl]cyclohexane, m-xylenediamine, o-xylenediamine, p-xylenediamine, 4,4'methylene bis[benzeneamine], phenylene diamine, diethylene triamine, hexamethylene diamine, N,N-bis[3-amino propyl]peperidine, 1,4-butane diamine, 1,5-pentane diamine, triethylene tetramine, neoalkoxy titanate coupling agents, neoalkoxy zirconate coupling agents, and mixtures thereof.

5. The golf ball according to claim 4, wherein the neoalkoxy titanate coupling agents are selected from the group consisting of neopentyl(diallyl)oxy tri(N-ethylenediamino)ethyl titanate, neopentyl(diallyl)oxy tri(m-amino) phenyl titanate, isopropyl tri(N-ethylenediamino)ethyl titanate, and mixtures thereof.

6. The golf ball according to claim 4, wherein the neoalkoxy zirconate coupling agents are selected from the group consisting of neopentyl(diallyl)oxy tri(N-ethylenediamino)ethyl zirconate, neopentyl(diallyl)oxy tri(m-amino) phenyl zirconate, dineopentyl(diallyl)oxy di(3-mercapto) propionic zirconate, and mixtures thereof.

7. The golf ball according to claim 1 further comprising at least one polymer.

8. The golf ball according to claim 7, wherein the polymer is selected from the group consisting of thermoplastic elastomer, thermoset elastomer, synthetic rubber, thermoplastic vulcanizate, copolymeric ionomer, terpolymeric ionomer, polycarbonate, polyolefin, polyamide, copolymeric polyamide, polyesters, polyvinyl alcohols, acrylonitrile-butadiene-styrene copolymers, polyarylate, polyacrylate, polyphenylene ether, modified polyphenyl ether, high-impact polystyrene, diallyl phthalate polymer, metallocene catalyzed polymers, acrylonitrile-styrene-butadiene, styrene-acrylonitrile, olefin-modified styrene-acrylonitrile, acrylonitrile styrene acrylonitrile, styrene-maleic anhydride polymer, styrenic copolymer, functionalized styrenic copolymer, functionalized styrenic terpolymer, styrenic terpolymer, cellulose polymer, liquid crystal polymer, ethylene-propylene-diene terpolymer, ethylene-vinyl acetate copolymers, ethylene-propylene copolymer, ethylene vinyl acetate, polyurea, polysiloxane, metallocene-catalyzed polymers thereof, and mixtures thereof.

9. The golf ball according to claim 1 further comprising a polyamide.

10. The golf ball according to claim 9, wherein the polyamide is obtained using a process selected from the group consisting of a polycondensation of a dicarboxylic acid with a diamine, a ring-opening polymerization of a cyclic lactam, a polycondensation of an aminocarboxylic acid, and a copolymerization of a cyclic lactam with a dicarboxylic acid and a diamine.

11. The golf ball according to claim 9, wherein the polyamide is selected from the group consisting of Nylon 6, Nylon 66, Nylon 610, Nylon 11, Nylon 12, copolymerized Nylon, Nylon MXD6, Nylon 46, and mixtures thereof.

12. The golf ball according to claim 1 further comprising a polyester elastomer.

13. The golf ball according to claim 1 further comprising a silicone material.

14. The golf ball according to claim 13, wherein the silicone material is selected from the group consisting of a monomer, an oligomer, a prepolymer, a polymer, trimethylsiloxy-endblocked dimethylsiloxane-methylhexenylsiloxane copolymers, dimethylhexenlylsiloxy-endblocked dimethylsiloxane-methylhexenylsiloxane copolymers, trimethylsiloxy-endblocked dimethylsiloxane-methylvinylsiloxane copolymers, trimethylsiloxy-endblocked methylphenylsiloxane-dimethylsiloxane-methylvinylsiloxane copolymers, dimethylvinylsiloxy-endblocked dimethylpolysiloxanes, dimethylvinylsiloxy-endblocked dimethylsiloxane-methylvinylsiloxane copolymers, dimethylvinylsiloxy-endblocked methyiphenylpolysiloxanes, dimethylvinylsiloxy-endblocked methyiphenylsiloxane-dimethylsiloxane-methylvinylsiloxane copolymers, and mixtures thereof.

15. The golf ball according to claim 13, wherein the silicone material includes an alkenyl group having at least two carbon atoms.

16. The golf ball according to claim 15, wherein the alkenyl group is selected from the group consisting of vinyl, allyl, butenyl, pentenyl, hexenyl, and decenyl.

17. The golf ball according to claim 7 wherein the polymer is a copolymer.

18. The golf ball according to claim 17, wherein the copolymer comprises an epoxy monomer.

19. The golf ball according to claim 18, wherein the copolymer is selected from the group consisting of a styrene-butadiene-styrene block copolymer in which the butadiene block comprises the epoxy monomer, and a styrene-isoprene-styrene block copolymer in which the isoprene block comprises the epoxy monomer, and mixtures thereof.

20. The golf ball according to claim 1 further comprising an ingredient selected from the group consisting of a colorant, a UV stabilizer, a photo stabilizer, an antioxidant, a colorant, a dispersant, a mold releasing agent, a processing aid, a filler, and mixtures thereof.

21. The golf ball according to claim 20, wherein the filler is an inorganic filler.

22. The golf ball according to claim 21, wherein the inorganic filler is selected from the group consisting of titanium dioxide, calcium carbonate, zinc sulfate, zinc oxide, and mixtures thereof.

23. The golf ball according to claim 20, wherein the filler is selected from the group consisting of zinc oxide, barium sulfate tungsten, and mixtures thereof.

24. A golf ball having a core and an outer cover layer over the core, and a coefficient of restitution of less than 0.83 prepared by a process comprising the steps of:
   providing an ionomer comprising a copolymeric ionomer E/Y or a terpolymeric ionomer E/X/Y, where E represents ethylene, X represents a softening monomer, and Y represents acrylic or methacrylic acid;
   providing an amine-functionalized chemical;
   mixing the ionomer with the amine-functionalized chemical; and
   incorporating the mixture of the ionomer and the amine-functionalized chemical into the outer cover layer of the golf ball.

25. The golf ball according to claim 24 having a coefficient of restitution of from 0.704 to 0.746.

* * * * *